(12) United States Patent
Zimmer

(10) Patent No.: US 6,883,966 B2
(45) Date of Patent: Apr. 26, 2005

(54) WINDSHIELD WIPER, ESPECIALLY FOR MOTOR VEHICLES AND METHOD FOR PRODUCTION OF SAID WINDSHIELD WIPER

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 10/221,610

(22) PCT Filed: Dec. 15, 2001

(86) PCT No.: PCT/DE01/04763

§ 371 (c)(1),
(2), (4) Date: Sep. 13, 2002

(87) PCT Pub. No.: WO02/076797

PCT Pub. Date: Oct. 3, 2002

(65) Prior Publication Data

US 2003/0077013 A1 Apr. 24, 2003

(30) Foreign Application Priority Data

Mar. 22, 2001 (DE) ......................................... 101 14 033

(51) Int. Cl.[7] .............................................. F16C 17/02
(52) U.S. Cl. ...................................... 384/372; 384/373
(58) Field of Search .................................. 384/372, 373, 384/376, 908, 909, 397, 415, 114, 398

(56) References Cited

U.S. PATENT DOCUMENTS 6,138,320 A   10/2000   Komo

FOREIGN PATENT DOCUMENTS

DE   199 27 067 A   12/2000
FR   2 370 610 A   6/1978

*Primary Examiner*—Lenard A. Footland
(74) *Attorney, Agent, or Firm*—Michael J. Striker

(57) ABSTRACT

A windshield wiper system, and a method for producing such a system, in particular for a motor vehicle, having at least one wiper bearing (14) substantially comprising an injection-moldable material, in particular plastic, in which a wiper shaft (16) is supported at least in such a way that it can swing back and forth, and in the region of the wiper shaft (16), the wiper bearing (14) has a substantially hollow-cylindrical segment (24) on whose inner surface (34) at least one groove (40) is provided; at least one, in particular riblike, accumulation of material (38) is provided on the outer surfaces of the hollow-cylindrical segment (24), which accumulation is disposed in the radially outward direction of the groove (40) relative to the axis of rotation of the wiper shaft (16).

10 Claims, 3 Drawing Sheets

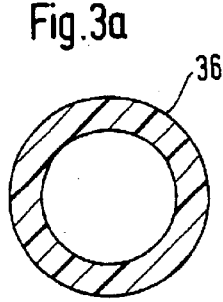
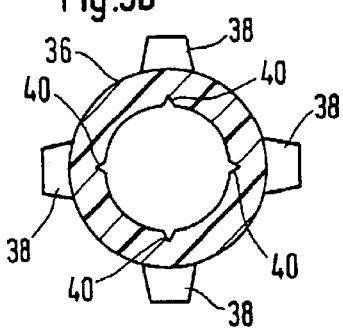
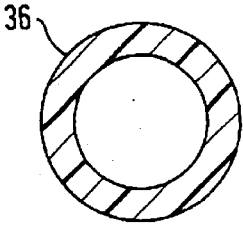
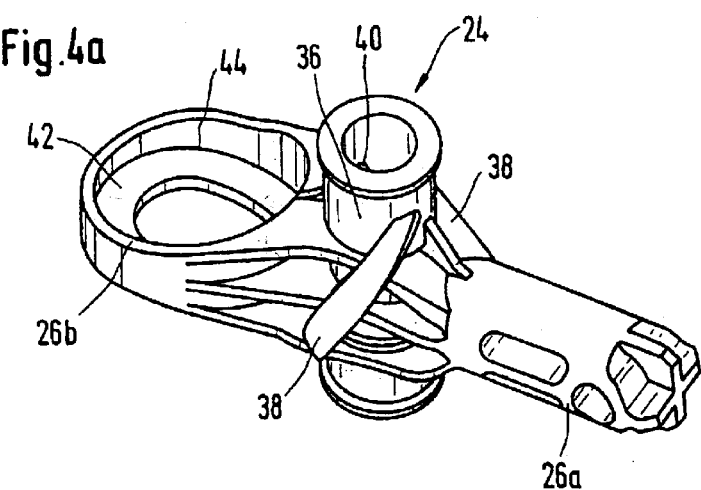
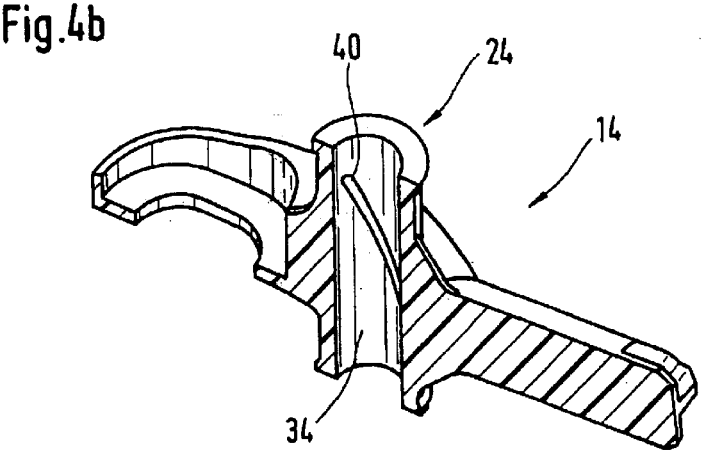

WINDSHIELD WIPER, ESPECIALLY FOR MOTOR VEHICLES AND METHOD FOR PRODUCTION OF SAID WINDSHIELD WIPER

BACKGROUND OF THE INVENTION

The invention relates to a windshield wiper system and a method for producing such a system. Numerous windshield wiper systems are already known which have a basic structure assembled from tubes, also known as a tubular mounting, on each of whose ends a wiper bearing is secured. These wiper bearings each have a wiper shaft, on the end of which a wiper arm that supports a wiper blade is secured.

Increasingly, to reduce weight, the wiper bearings are being made from plastic; a bearing plate is omitted, and the wiper shaft is supported directly in the plastic. Stringent demands are made of the wiper bearing in terms of wear, since these wiper bearings must function properly over many thousand wiping cycles. To that end, these wiper bearings must be lubricated, and defined grooves must be provided for the lubricant.

SUMMARY OF THE INVENTION

The windshield wiper system of the invention has the advantage that the wiper bearing can be produced of plastic by injection molding, and the requisite groove for receiving the lubricant can be produced using a circular-cylindrical tool die. This reduces tool costs, since no further machining steps are needed to create a lubrication groove. Moreover, the wiper shaft can be dimensioned with a smaller diameter, since no notches for creating a grease chamber are needed in the wiper shaft.

It is especially advantageous if a plurality of grooves, in particular three to four of them, for receiving a lubricant are provided, since in this way an adequate quantity of lubricant can be placed in the bearing, without impairing the overall stability of the bearing.

It is also advantageous if the accumulation of material is embodied as substantially block-shaped.

Block-shaped accumulations of material in the casting mold can be produced without problems, without significantly increasing tool costs. This is equally true for essentially semicylindrical accumulations of material.

It is also considered advantageous if the accumulation of material is disposed substantially parallel to the wiper shaft. In this arrangement, the lubricant can easily be placed in the groove.

It is especially advantageous, however, if the accumulation of material is disposed substantially helically, since then the bearing surface is uninterrupted in one or more specified force directions. Hence in operation, that is, when the bearing shaft is rotating and alternating changes in load direction are occurring, the portions of the inner surface of the wiper bearing on the shaft always have approximately the same area. This prevents any alternation between linear contact and area contact.

It is especially advantageous if the grooves have a minimum spacing from the bottom and top faces of the wiper bearing, and particularly if this spacing is about 10 mm. The result is strong sealing of the bearing, so that the lubricant cannot be washed out. Moreover, this provides a complete cylindrically radial bearing face in the region of the bottom and top faces of the wiper bearing, which improves the running properties of the wiper bearing.

Since the width of the groove can be adjusted via the width of the accumulation of material, it furthermore proves advantageous if the accumulation of material is disposed substantially flatly. In this way, large quantities of lubricant can be placed in the bearing region.

The method of the invention defined by the characteristics of claim 9 has the advantage that without further processing steps, grooves for receiving a lubricant are created on the inner surface of the wiper bearing, on the slide face between the wiper bearing and the wiper shaft. This is possible because a simple cylindrical tool die is used; by this method, arbitrary chamber geometries can be produced. In particular, helical chambers can be created in this way, despite a rectilinear tool opening.

Moreover, by this method the groove can be embodied entirely on the inside, so that lubricant placed in the wiper bearing before the wiper shaft is inserted cannot escape or be washed out.

BRIEF DESCRIPTION OF THE DRAWINGS

Exemplary embodiments of the invention are shown in the drawings and described in further detail in the ensuing description. Shown are:

FIGS. 3a, 3b and 3c, various sections through the hollow-cylindrical segment of the wiper bearing;

FIG. 4a, a wiper bearing with helical grooves, in perspective;

FIG. 4b, a wiper bearing with helical grooves, in a perspective sectional view.

DESCRIPTION OF THE PREFERRED EMBODIMENTS

Figure 1:
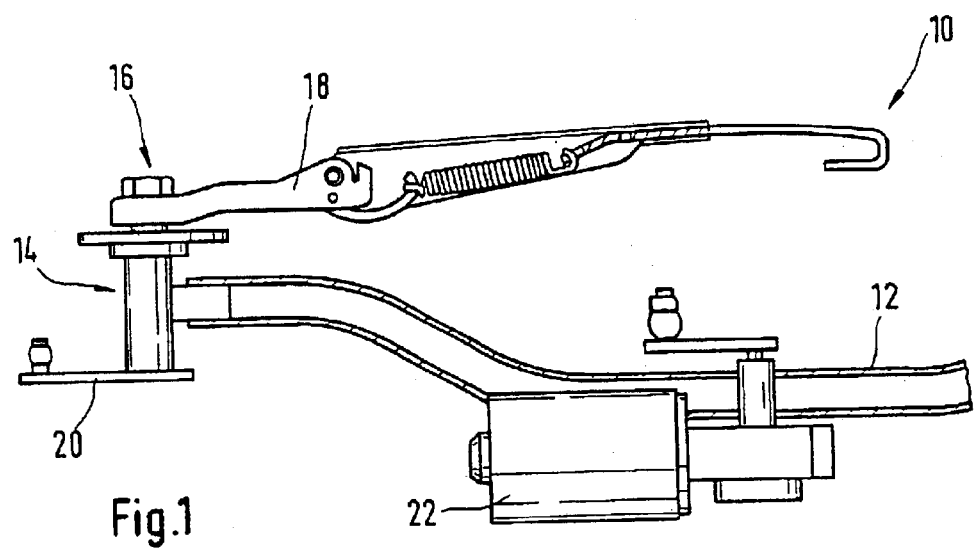
FIG. 1, a windshield wiper system of the invention shown schematically.

In FIG. 1, a windshield wiper system 10 is shown schematically. It substantially comprises a tubular mounting 12, which carries a wiper bearing 14 on one end. A wiper shaft 16 is supported in this wiper bearing and is connected on one end to a wiper arm 18 in a manner fixed against relative rotation. On the other side, the wiper shaft 16 is connected to a pivot crank 20 in a manner fixed against relative rotation; this crank is driven by a wiper motor 22, via a rod linkage not shown for the sake of simplicity.

Figure 2:
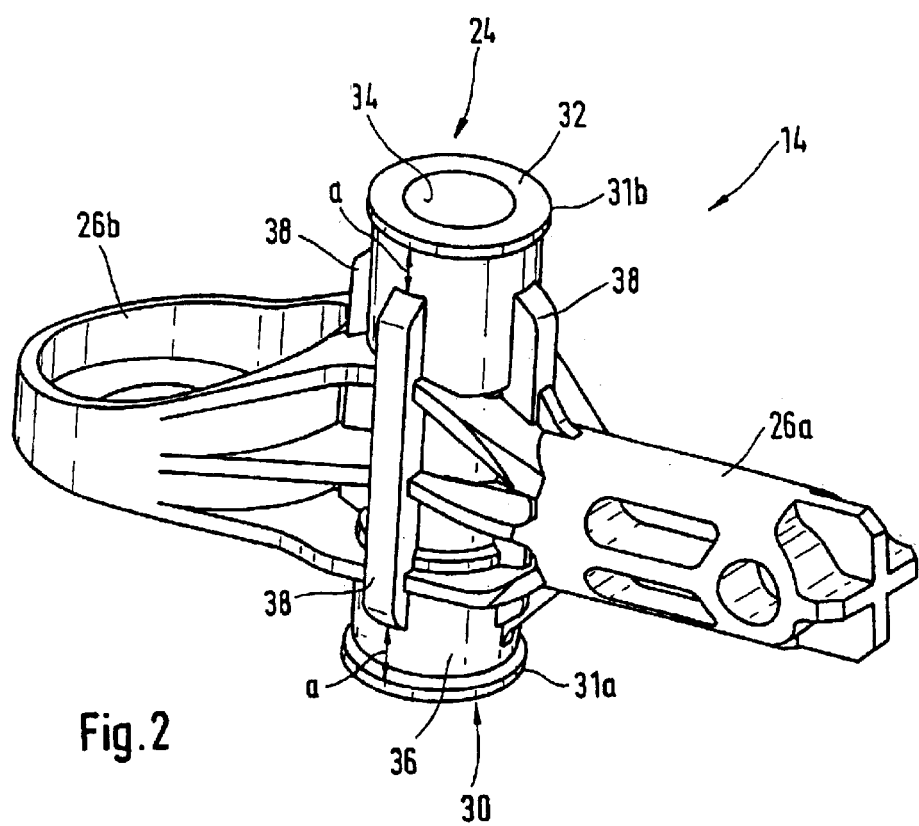
FIG. 2, a wiper bearing of the invention, in perspective.

FIG. 2 shows a wiper bearing 14 of a windshield wiper system 10 of the invention in a perspective view. This wiper bearing 14 substantially comprises a hollow-cylindrical segment 24, in which the wiper shaft 16 can be supported. Transversely to the wiper shaft, fastening regions 26a, 26b are formed on; they serve to secure the wiper bearing 14 to the tubular mounting 12 on the one hand and to the vehicle body on the other. To improve the stability of the connection between the hollow-cylindrical segment 24 and the fastening regions 26a, 26b, the latter are secured to the segment 24 by means of fastening ribs 28. Moreover, the hollow-cylindrical segment 24 has a bottom face 30 and a top face 32, which limit it in its length. Both on the bottom face 30 and the top face 31, the segment 24 furthermore has a respective reinforcing ring 31a, b, which may also be embodied integrally with the segment 24.

The slide face between the wiper shaft 16 and the hollow-cylindrical segment 24 is created by an inner surface 34 of the hollow-cylindrical segment 24. On an outer surface 36 of the hollow-cylindrical segment 24 that describes a cylindrical jacket, riblike accumulations of material 38 are disposed, extending axially along the hollow-cylindrical segment 24. However, these accumulations of material 38 are guided along the bottom and top faces 30, 32 of the hollow-cylindrical segment 24 only down as far as a minimum spacing a.

In FIGS. 3a, 3b and 3c, cross sections through the hollow-cylindrical segment 24 of the wiper bearing 14 are shown. FIG. 3a shows a bottom face 30 of the segment 24, and FIG. 3c shows the top face 32 of the segment 24, respectively just above and just below the reinforcing rings 31a and 31b. In FIG. 3b, a cross section is shown through the middle—in the axial direction—between the bottom face 30 and the top face 32. The fastening regions 26 (FIG. 2) and the reinforcing rings 31a, 31b are left out here, for the sake of simplicity.

In FIG. 3b, four accumulations of material 38 can be seen, distributed uniformly over the outer surface 36 of the segment 24. One groove 40 is disposed on each corresponding inner surface 34 of the cylindrical segment 24. This groove 40 is created by because when the plastic cools in the casting process, increased shrinkage occurs because of the accumulations of material 38, creating sunken places. The accumulations of material 38 are purposefully embodied such that the sunken places form the grooves 40, which can serve to receive a lubricant for the wiper bearing 14. The accumulations of material 38 are at least as thick as the wall thickness of the hollow-cylindrical segment 24, for the sake of achieving an adequate depth of the grooves 40.

In FIGS. 3a and 3c, that is, in the regions of the bottom and top faces 30, 32, no accumulations of material 38 are embodied on the outer surface 36, and therefore no grooves 40 have been created in these regions. The result is ideal sealing of the wiper bearings 14.

In FIG. 4a, as in FIG. 2, a wiper bearing 14 is shown in perspective. Here, however, the accumulations of material 38 are disposed helically on the outer surface 36 of the cylindrical segment 24. The two fastening regions 26a and 26b are clearly visible here as well. One fastening region 26a is embodied cylindrically. It is thrust into the tubular mounting 12 of the windshield wiper system 10 and locked, for instance by crimping. The other fastening region 26b is embodied as an eyelet 42, which is surrounded by a collar 44. This collar serves to secure the windshield wiper system 10 to the body of a vehicle. In FIG. 4b, a longitudinal section through a wiper bearing 14 of FIG. 4a is shown. The inner surface 34 of the hollow-cylindrical segment 24 is clearly visible here. It—in a way corresponding to the accumulations of material 38 of FIG. 4a—has the helical groove 40, which serves to receive a lubricant.

Figure 5A:
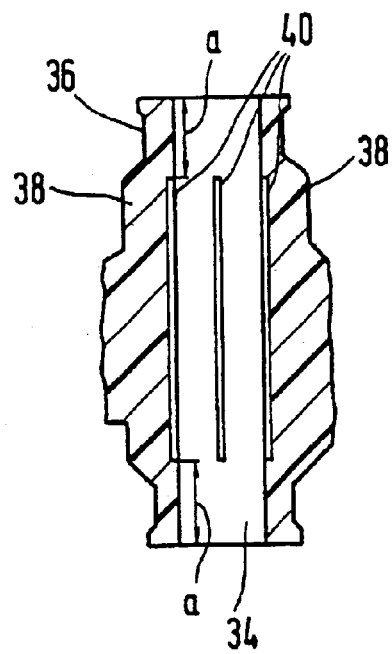
FIG. 5, longitudinal sections through wiper bearings with various grooves.
Figure 5B:
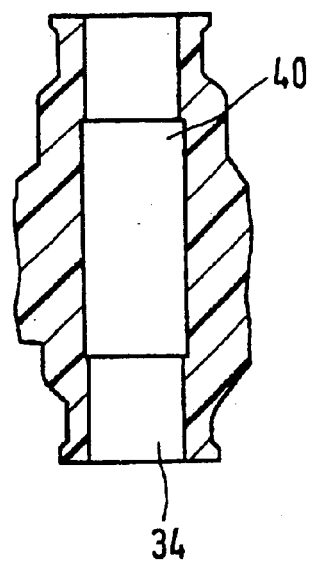
Figure 5C:
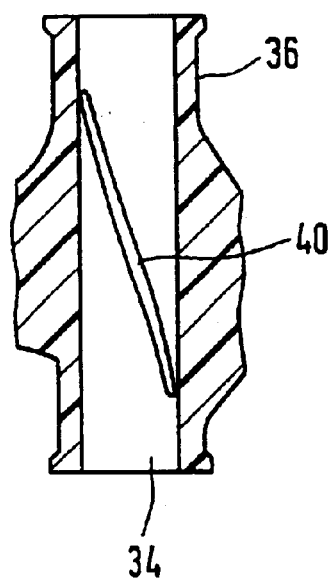

In FIGS. 5a, 5b and 5c, various longitudinal sections are shown through various cylindrical segments 24 of a windshield wiper system 10 of the invention. In FIG. 5a, the grooves 40 are shown, which extend parallel to the axis of rotation of the wiper shaft. They are each spaced apart by a minimum spacing A from the bottom and top faces 30, 32 of the cylindrical segment 24, to assure adequate tightness of the bearing. In FIG. 5b, the grooves 40 are embodied as very wide, so that the groove 40 is more like a two-dimensional region. In FIG. 5c, the groove 40 is disposed helically.

In a refinement, it is also possible to make bores in the accumulations of material 38, through which bores the lubricant can be introduced later, for instance during maintenance. To increase the stability, it is also conceivable to embody the reinforcing rings 31a, b of metal, and to form the rest of the wiper bearing onto the rings. The accumulations of material 38 can also comprise a different material from the rest of the bearing components. In that case, however, the various materials must be injection-molded in rapid succession.

In principle, the method can be performed, or the wiper bearing 14 embodied, with other materials than plastic instead.

What is claimed is:

1. A windshield wiper system for a motor vehicle, having at least one one-piece wiper bearing (14) substantially comprising an injection-moldable material, that is plastic, in which a wiper shaft (16) is supported at least in such a way that it can swing back and forth, and in the region of the wiper shaft (16), the wiper bearing (14) has a substantially hollow-cylindrical segment (24) on whose inner surface (34) at least one groove (40) is provided, wherein at least one riblike accumulation of material (38) is provided on the outer surfaces of the hollow-cylindrical segment (24), which accumulation is disposed in the radially outward direction of the groove (40) relative to the axis of rotation of the wiper shaft (16), circumferentially tracking and corresponding to the course of the at least one groove.

2. The system of claim 1, wherein a plurality of grooves (40), in particular from three to four of them are provided for receiving a lubricant.

3. The system of claim 2, wherein the plurality of grooves (40) include four grooves.

4. The system of claim 2, wherein the at least one groove (40) has a minimum spacing (a) of 10 mm from the bottom and top faces (30, 32) of the hollow-cylindrical segment (24).

5. The system of claim 1, wherein the accumulation of material (38) is embodied as substantially block-shaped.

6. The system of claim 1, wherein the accumulation of material (38) is embodied substantially semicylindrically.

7. The system of claim 1, wherein the accumulation of material (38) is disposed substantially parallel to the wiper shaft (16).

8. The system of claim 1, wherein the accumulation of material (38) is disposed substantially flatly.

9. The system of claim 1, wherein the at least one groove (40) has a minimum spacing (a) of 5 mm to 15 mm from the bottom and top faces (30, 32) of the hollow-cylindrical segment (24).

10. The system of claim 1, wherein the hollow-cylindrical segment has bottom (30) and top (32) faces, and in regions of the bottom and top faces (30, 32) there are no accumulations of material (38) provided on the outer surfaces of the hollow-cylindrical segment (24) so that no grooves (40) are created in these regions.

* * * * *